(12) United States Patent
Boyer et al.

(10) Patent No.: US 8,381,169 B2
(45) Date of Patent: Feb. 19, 2013

(54) EXTENDING UNIFIED PROCESS AND METHOD CONTENT TO INCLUDE DYNAMIC AND COLLABORATIVE CONTENT

(75) Inventors: John E. Boyer, Seattle, WA (US); Eoin Lane, Littleton, MA (US); Bertrand H. Portier, Keswick (CA)

(73) Assignee: International Business Machines Corporation, Armonk, NY (US)

( * ) Notice: Subject to any disclaimer, the term of this patent is extended or adjusted under 35 U.S.C. 154(b) by 1485 days.

(21) Appl. No.: 11/927,877

(22) Filed: Oct. 30, 2007

(65) Prior Publication Data

US 2009/0113378 A1 Apr. 30, 2009

(51) Int. Cl.
*G06F 9/44* (2006.01)
*G06F 15/16* (2006.01)
*G06F 17/24* (2006.01)

(52) U.S. Cl. ........ 717/101; 717/103; 717/120; 709/204; 709/205; 715/209

(58) Field of Classification Search .................. None
See application file for complete search history.

(56) References Cited

U.S. PATENT DOCUMENTS

| | | | | |
|---|---|---|---|---|
| 6,513,154 | B1 * | 1/2003 | Porterfield | 717/101 |
| 7,472,342 | B2 * | 12/2008 | Haut et al. | 715/234 |
| 7,631,006 | B2 * | 12/2009 | Hagstrom et al. | 1/1 |
| 2003/0046345 | A1 * | 3/2003 | Wada et al. | 709/205 |
| 2003/0110448 | A1 * | 6/2003 | Haut et al. | 715/513 |
| 2004/0107249 | A1 * | 6/2004 | Moser et al. | 709/204 |
| 2004/0153509 | A1 * | 8/2004 | Alcorn et al. | 709/205 |
| 2006/0167844 | A1 * | 7/2006 | Srinivas et al. | 707/3 |
| 2006/0271913 | A1 * | 11/2006 | Erf | 717/120 |
| 2006/0282759 | A1 * | 12/2006 | Collins et al. | 715/500 |
| 2007/0006126 | A1 * | 1/2007 | Calkins et al. | 717/103 |
| 2007/0016891 | A1 * | 1/2007 | Cantor | 717/120 |
| 2007/0112913 | A1 * | 5/2007 | Bales | 709/204 |
| 2008/0021777 | A1 * | 1/2008 | Mack et al. | 705/14 |
| 2008/0141214 | A1 * | 6/2008 | Olson | 717/101 |
| 2008/0313597 | A1 * | 12/2008 | Brown et al. | 717/101 |

(Continued)

OTHER PUBLICATIONS

Haumer, P. Eclipse Process Framework Composer Part 1:Key Concepts. Feb. 16, 2006. [retrieved on Jul. 26, 2011]. Retrieved from the Internet:<URL:http://web.archive.org/web/20060216125019/http://www.eclipse.org/epf/general/EPFComposerOverviewPart1.pdf>.*

(Continued)

*Primary Examiner* — Tuan Q Dam
*Assistant Examiner* — Geoffrey St Leger
(74) *Attorney, Agent, or Firm* — Patents on Demand P.A.; Brian K. Buchheit; Scott M. Garrett (57) ABSTRACT

The present invention discloses a unified process system that includes placeholders for editable content that extends unified process methods. The unified process system can store, manage, organize, and present information and artifacts associated with a unified process. The unified process system can include a placeholder defining tool configured to permit an authorized process engineer to associate placeholders with base methods of the unified process. Unified process consumers can input content to the placeholders, where the input content is thereafter automatically stored by the unified process system and is accessible to other unified process consumers having access to the unified process system. More specifically, placeholders can include a collaborative section for guidance content concerning a related base method and a dynamic section, dynamically built in response to received requests, which includes items to assist consumers to conduct a task for an associated base method.

11 Claims, 6 Drawing Sheets

U.S. PATENT DOCUMENTS

2009/0037870 A1* 2/2009 Santos-Gomez ............. 717/101

OTHER PUBLICATIONS

Haumer, P. Eclipse Process Framework Composer Part 2:Authoring method content and processes. Feb. 16, 2006. [retrieved on Jul. 26, 2011]. Retrieved from the Internet:<URL: http://web.archive.org/web/20060216125019/http://www.eclipse.org/epf/general/EPFComposerOverviewPart2.pdf>.*

Buyens, J., Microsoft Windows SharePoint Services Inside Out, Microsoft Press, Feb. 9, 2005, 14 pages, [retrieved on Dec. 6, 2011] Retrieved from the Internet: <URL:academic.safaribooksonline.com>.*

Kroll, P., Introducing IBM Rational Method Composer, developerWorks, Nov. 15, 2005, 6 pages, [retrieved on Sep. 24, 2012], Retrieved from the Internet:<URL:http://www.ibm.com/developerworks/rational/library/nov05/kroll/index.html>.*

Cossentino, M., et al., Composition of a New Process to Meet Agile Needs Using Method Engineering, SELMAS 2004, LNCS 3390, pp. 36-51, 2005, Springer-Verlag Berlin Heidelberg, [retrieved on Sep. 24, 2012], Retrieved from the Internet:<URL:http://www.springerlink.com/content/ewm2mpptcfc3rbu4/>.*

* cited by examiner

EXTENDING UNIFIED PROCESS AND METHOD CONTENT TO INCLUDE DYNAMIC AND COLLABORATIVE CONTENT

BACKGROUND

1. Field of the Invention

The present invention relates to the field of software development processes and, more particularly, to extending unified process and method content to include dynamic and collaborative content.

2. Description of the Related Art

Modem software development methods employ complex and sophisticated process frameworks which allow many resources to collaborate. One such process framework is the Unified Process or Rational Unified Process (RUP). RUP method contents can often be published as a Hypertext Markup Language (HTML) documents. The published process acts as a guide to tooling, content, people, and resources for users involved in the process. However, the published content is not as flexible and agile as the processes it profiles. As assets change in the process, the published content quickly becomes outdated and requires republishing. However, republishing is time consuming and as a result does not occur frequently. This leads to "frozen" processes that are not extensible and lack currency.

Further, IT professionals who want to provide feedback and collaboration to the methods are often unable to due to the static nature of published content. Consequently, collaboration and feedback occurs independent of the processes which can leave a rift between the user community and process guidance documentation. Because user communities are often key to providing customized process guidance for domain specific adaptations, the lack of feedback and collaboration results in a deficiency of detailed support. When method content remains relatively unchanged, the advantages associated with an agile process are lost. It would be advantageous if method content remained up-to-date and formed a cohesive body of guidance.

Figure 1:
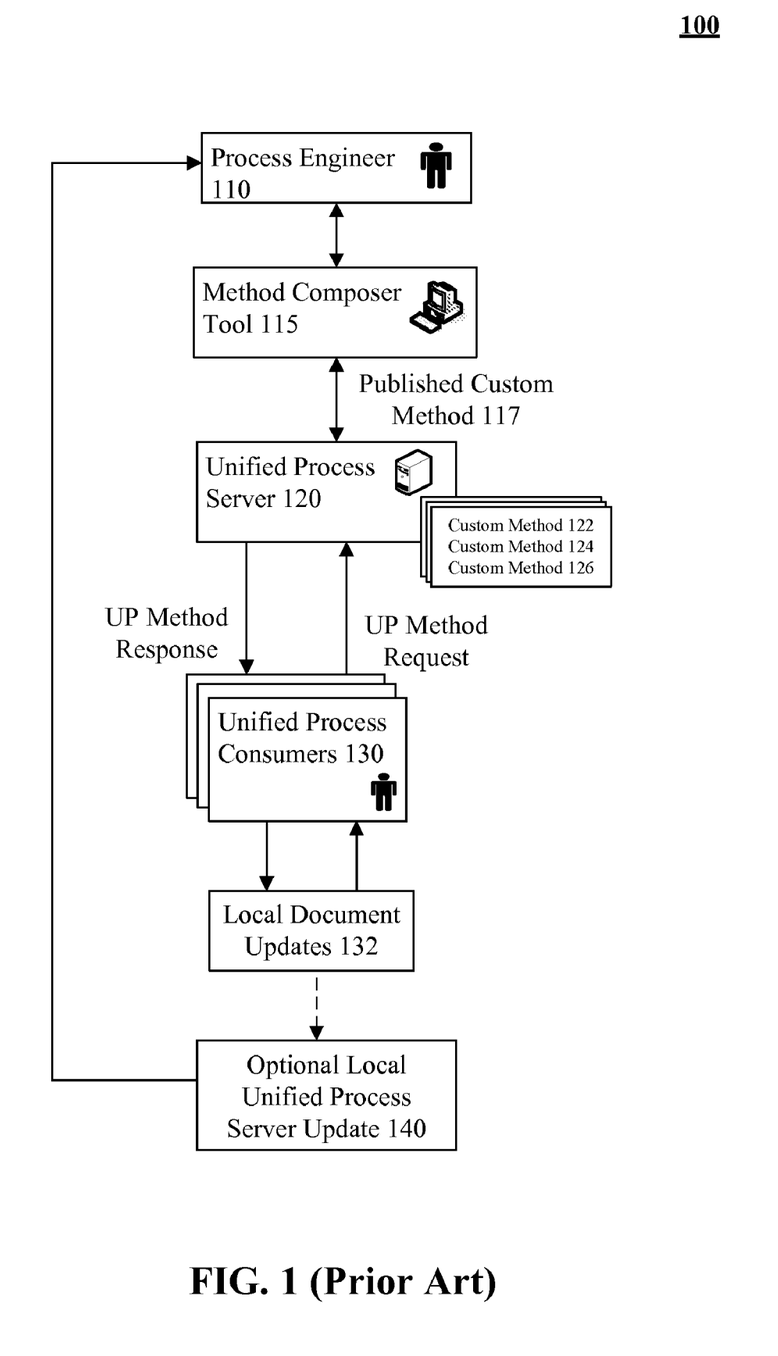
FIG. 1 (Prior Art) illustrates a conventional Unified Process.

Current manifestations of development processes involving a unified process fall short in providing adequate feedback mechanisms from users and practitioners as evident by FIG. 1 (Prior Art) that illustrates a conventional Unified Process. As shown in FIG. 1 (Prior Art), a process engineer 110 can publish a custom method 117 using method composer tool 115. The published custom method 117 can comprise one or more custom methods 122-126. Published custom method 117 can be provided to unified process consumers 130 via unified process server 120. It is not uncommon for consumers 130 to locally store a set of method 117 related documents, not managed by server 120. The local documents can, for example, include in-process documents standards/code as well as method 117 related research and project annotations. These local documents can be shared with team members in an uncontrolled and/or inconsistent fashion. When shared, local document updates 132 can occur.

However, these updates 132 are often isolated to specific consumers unless an optional local unified process server update 140 occurs. Server updates 140 occur infrequently as updates are a static process which is time and resource intensive. Thus a server update 140 can occur only after a substantial delay, which significantly decreases value of shared documents. Additionally, updates generally require the attention of the process maintainer or engineer 110, who may be too overloaded. These factors result in a rigid unified process situation where consumer feedback and consumer created content is handled in an ad hoc manner or untimely fashion.

SUMMARY OF THE INVENTION

The present invention discloses a solution for extending unified process content to include dynamic and collaborative content. Unified process content refers to a set of best practices codified as processes/methods. The solution can include placeholder entries for additional contents in a published base method. Placeholder entries can indicate external context specific content can be provided by users of the processes. External content can be presented in a Hypertext Markup Language (HTML) extension page which can contain user editable and read-only areas. One or more portions of the external extension pages can be dynamically created upon user request.

The present invention can be implemented in accordance with numerous aspects consistent with the material presented herein. For example, one aspect of the present invention can include a unified process system that includes placeholders for editable content that extends unified processes and methods. The unified process system can store, manage, organize, and present information and artifacts associated with a unified process. The unified process can be an extensible, iterative, and incremental software development process framework. Other processes, such as IT management processes, can also be considered within the scope of the present invention. The unified process system can include a placeholder defining tool configured to permit an authorized process engineer to associate placeholders with base methods of the unified process. Unified process consumers can input content to the placeholders, where the input content is thereafter automatically stored by the unified process system and is accessible to other unified process consumers having access to the unified process system.

Another aspect of the present invention can include a unified process interface that includes a static method interface and an extension point interface. The static method interface can be configured to permit unified process consumers to access a set of static methods maintained by a unified process server within a data store accessible by the unified process server. The extension interface can be programmatically linked to one of static methods presented within the static method interface. The extension interface can permit unified process consumers to modify content presented in the extension interface. Modified content can be managed by the unified process server. Other unified process consumers using their own version of the extension interface can view the modified content. To the user (reader) of the method/process, there may be no difference between base contents and extended contents. For example, both base and extended contents can be contained in HTML pages. A point to be emphasized is that specific portions of the method/process can exist that are modifiable by the user of the method/process or that are dynamically created at a time an HTML page is requested.

Still another aspect of the present invention can include a unified process server capable of handling placeholders associated with unified process methods. The server can include a set of programmatic instructions stored in a machine readable medium configured cause a server-side machine to store, manage, organize, and present information and artifacts associated with a unified process. The server can also fetch information from different sources and can dynamically create served content from these different sources. The information and artifacts are able to be presented to a set of unified process consumers accessing the content from a set of clients via a standard browser. The server can have access to a data store configured to store the information and artifacts. The artifacts can include a set of unified process methods and a set of placeholders. Each placeholder can be associated with one of the unified process methods. At least one process engineer can be authorized to enter new unified process methods, to edit base content of the unified process methods, and to associate new placeholders with the unified process methods. Unified process consumers can lack permissions to add new unified process methods, can lack permission to edit base content of the unified process methods, and can lack permission to associate new placeholders with the unified process methods. Unified process consumers can input content to the placeholders, where the input content is thereafter automatically stored by the unified process system and is accessible to other unified process consumers having access to the unified process system.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 2:
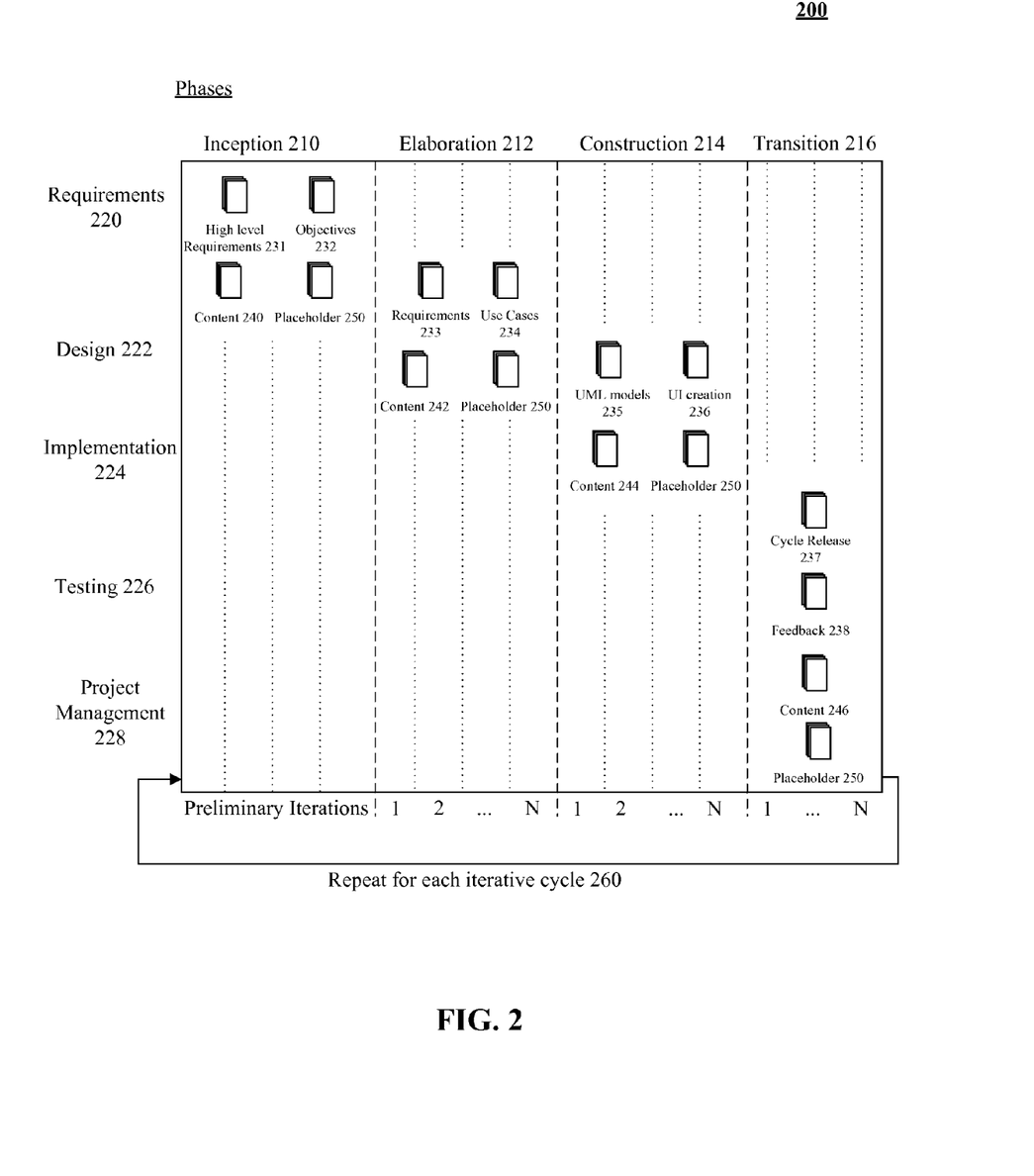
FIG. 2 is a schematic diagram illustrating a process for extending unified process content to include dynamic and collaborative content in accordance with the embodiment of inventive arrangements disclosed herein.

FIG. 2 is a schematic diagram illustrating a process 200 for extending unified process content to include dynamic and collaborative content in accordance with the embodiment of inventive arrangements disclosed herein. Process 200 can comprise of an iterative and incremental technique for software development capable of utilizing consumer feedback at each stage. Process 200 can be customized to fit specific organizations, projects and procedures as necessary. In process 200, software development artifacts 231-238 can be present throughout the life cycle. Artifact 231-238 construction and usage can be delineated by process 200.

Each of the four phases 210-216 of process 200, can include multiple steps 220-228. For example, phase 210 can include one or more time-boxed iterations of steps 220-228 throughout the phase 210 execution. Similarly, phases 212-216 can include any number of iterations of steps 220-228. Further, the process can repeat for each iterative cycle 260, from inception 210 to transition 216. Unlike conventional implementations of a unified process, process 200 can utilize placeholders 250 to facilitate structured collaboration among process contributors and to enable a forum for sharing dynamic content within context of a unified process guided effort.

Placeholder 250 can allow for managed process change from user feedback at a given iteration and step in process 200. Placeholder 250 can act as an access point to content 240-246, providing assistance to practitioners of process 200. For example, elaboration 212 phase can include placeholder 250 which can act as a reference point for content 242. Content 240-246 can include feedback from practitioners which can augment process 200. Content 240-246 can include comments, consumer created content, and the like. Content 240-246 can be presented in steps and iterations in which placeholder 250 has been established.

Although placeholders 250 are shown as being distinct from, yet related to, content 240, other implementations are contemplated. In one embodiment, placeholders 250 can be placed inside the base contents 240. Placeholders 250 can also be included inside high-level requirements. Additional or extended contents can be specified by users to "fill" the placeholders 250, which results in the additional contents being included next to the base contents 240 in presented Web pages.

Figure 3:
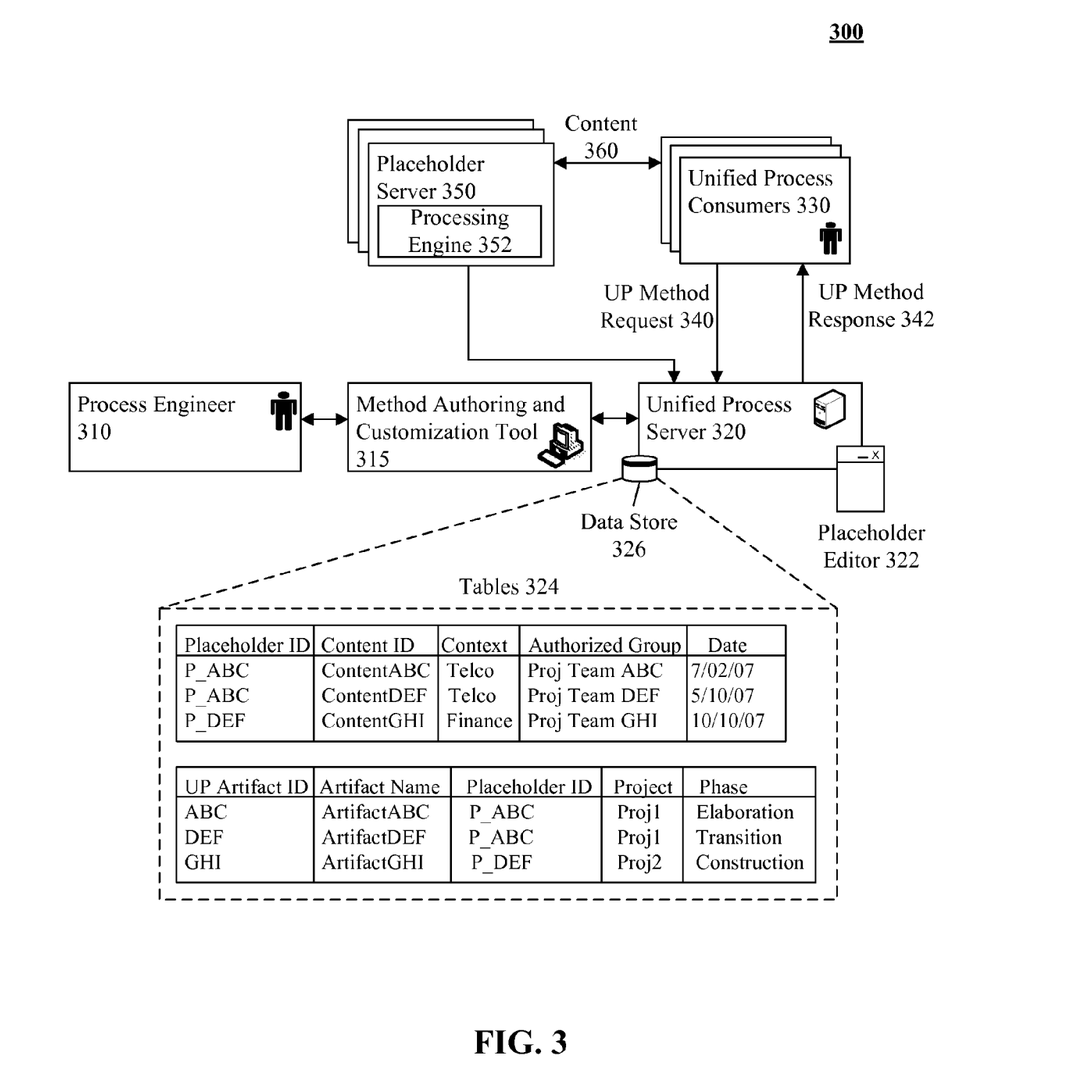
FIG. 3 is a schematic diagram illustrating a system for extending unified process content to include dynamic and collaborative content in accordance with the embodiment of inventive arrangements disclosed herein.

FIG. 3 is a schematic diagram illustrating a system 300 for extending unified process content to include dynamic and collaborative content in accordance with the embodiment of inventive arrangements disclosed herein. System 300 can be associated within the context of process 200. In system 300, a unified process residing on a unified process server 320 can include placeholders created by a process engineer 310. Placeholders can allow for dynamic and collaborative content to be added to a published unified process.

Process engineer 310 can manage a unified process using method authoring and customization tool 315. Tool 315 can publish a unified process to a unified process server 320 for consumption by unified process consumers 330. Process engineer 310 can interact with placeholder editor 322 to create, edit, and delete placeholder entries in a unified process. Placeholder entries can allow consumers 330 to add dynamic and collaborative content 360 such as video content, articles, RSS feeds, comments and the like.

Dynamic content can signify that a requested page can be built at a time it is requested. This requested page can include content fetched from different sources. Therefore, not all content conveyed to consumers 330 is necessarily maintained in data store 326 or in any data store maintained by or directly associated with the unified process server 320.

In one embodiment, placeholder entries can be stored and managed by placeholder server 350. Placeholder server 350 can include processing engine 352 which can index content 360. Content 360 can be dispersed over a network such as the Internet and can be referenced through hypertext linking. In one embodiment, content 360 can be cached to increase content retrieval access times.

A consumer 330 can perform a request/response 340-342 communication to unified process server 320 to obtain a published unified process. Consumers 330 can add content 360 to a unified process by interacting with a placeholder server 350. Unified process server 320 can receive placeholder and content change updates from placeholder server 350. Unified process server 320 can include data store 326 capable of storing information regarding placeholder and associated content 360. Tables 324 can include information about placeholder ID, content ID, process context, process artifacts and the like. For example, placeholder P_ABC can contain content ContentABC and ContentDEF, illustrating a one-to-many relationship can be contemplated. Tables 324 can be utilized to track unified process artifacts for multiple projects, phases, iterations, contexts and versions.

Unified process server 320 can include, but not limited to, a computing device capable of storing, managing, organizing, and presenting information and/or artifacts associated with a unified process. A unified process can be an extensible iterative and incremental software development process framework. For example, unified processes can include, but not limited to, Rational Unified Process, Rational Unified Process-System Engineering, Basic Unified Process, Open Unified Process, Enterprise Unified Process, Agile Unified Process, and the like.

As shown herein, data store 326 can be physically implemented within any type of hardware including, but not limited to, a magnetic disk, an optical disk, a semiconductor memory, a digitally encoded plastic memory, a holographic memory, or any other recording medium. Data store 326 can be stand-alone storage units as well as a storage unit formed from a plurality of physical devices, which may be remotely located from one another. Additionally, information can be stored within each data store 326 in a variety of manners. For example, information such as tables 324 can be stored within a database structure or can be stored within one or more files of a file storage system, where each file may or may not be indexed for information searching purposes.

As presented herein, the various components and actors of system 300 can communicate using a network (not shown). The network can include components capable of conveying digital content encoded within carrier waves. The content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

Figure 4:
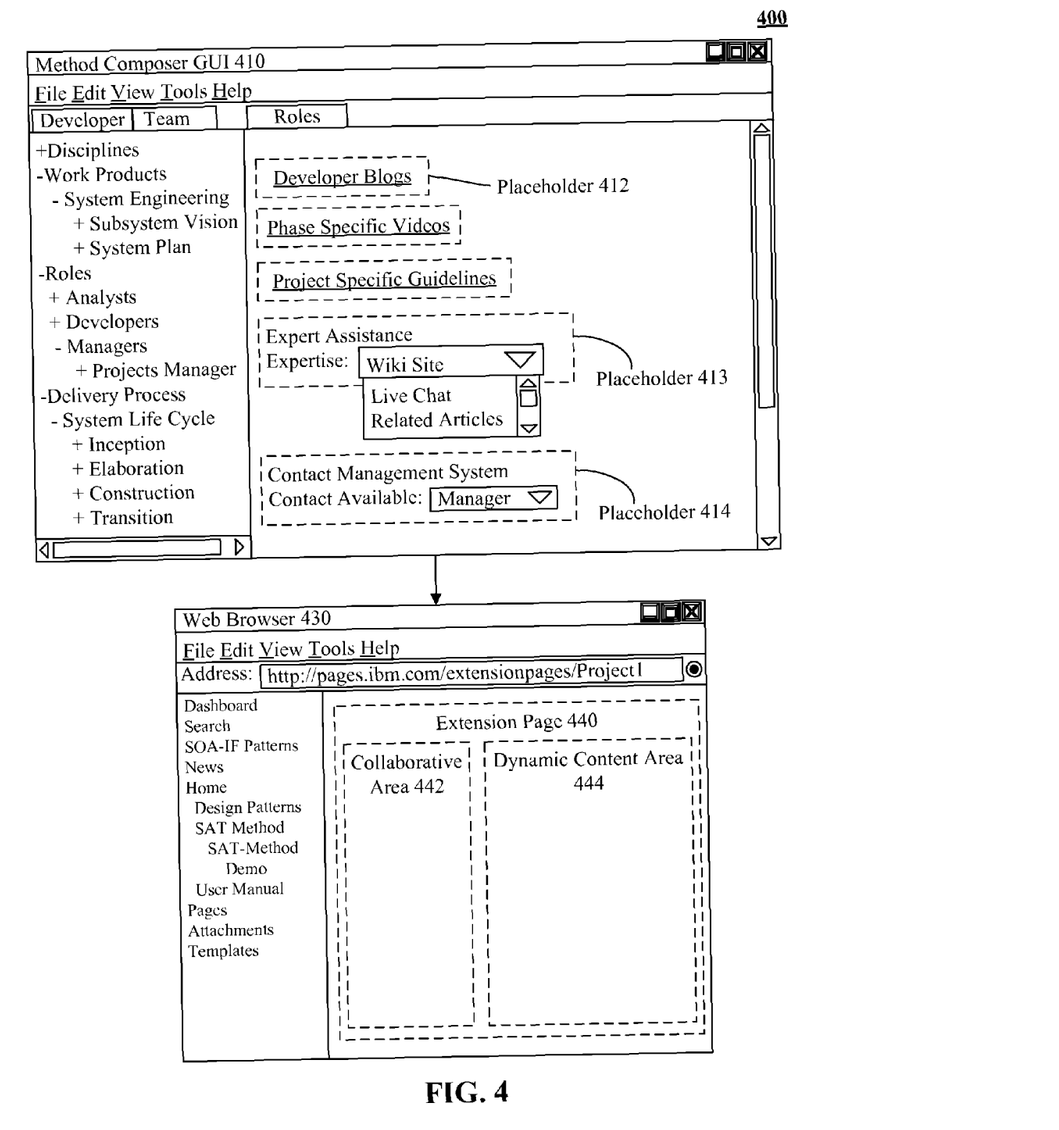
FIG. 4 is a schematic diagram illustrating a graphical user interface (GUI) for extending unified process content to include dynamic and collaborative content in accordance with the embodiment of inventive arrangements disclosed herein.

FIG. 4 is a schematic diagram illustrating a graphical user interface (GUI) 400 for extending unified process content to include dynamic and collaborative content in accordance with the embodiment of inventive arrangements disclosed herein. GUI 400 can be present in the context of system 300. In GUI 400, a method composer GUI 410 can allow a process engineer to create, modify, and delete placeholder 412-414 entries for a unified process. Placeholders 412-414 can be tailored to present specific content to a unified process consumer. For example, placeholder 412 can allow consumers to add URI addressable content such as weblogs, RSS feeds, and the like. Further, default placeholders can be contemplated which can allow for modular content addition by a process engineer. An expert assistance placeholder 413 can contain pre-populated content such as Wiki Web sites, related articles, and the like based on process context. In another embodiment, placeholder 414 can include component based functionality such as contact management systems, assets management systems and the like.

A consumer interacting with placeholder 412 can be directed to an interface 430 wherein the consumer can be presented with an extension page 440. For each placeholder 412-414 one or more extension pages 440 can exist. Extension page 442 can include a collaborative area 442 and/or a dynamic content area 444. Extension page 440 and associated content can be dynamically generated on page request.

Figure 5:
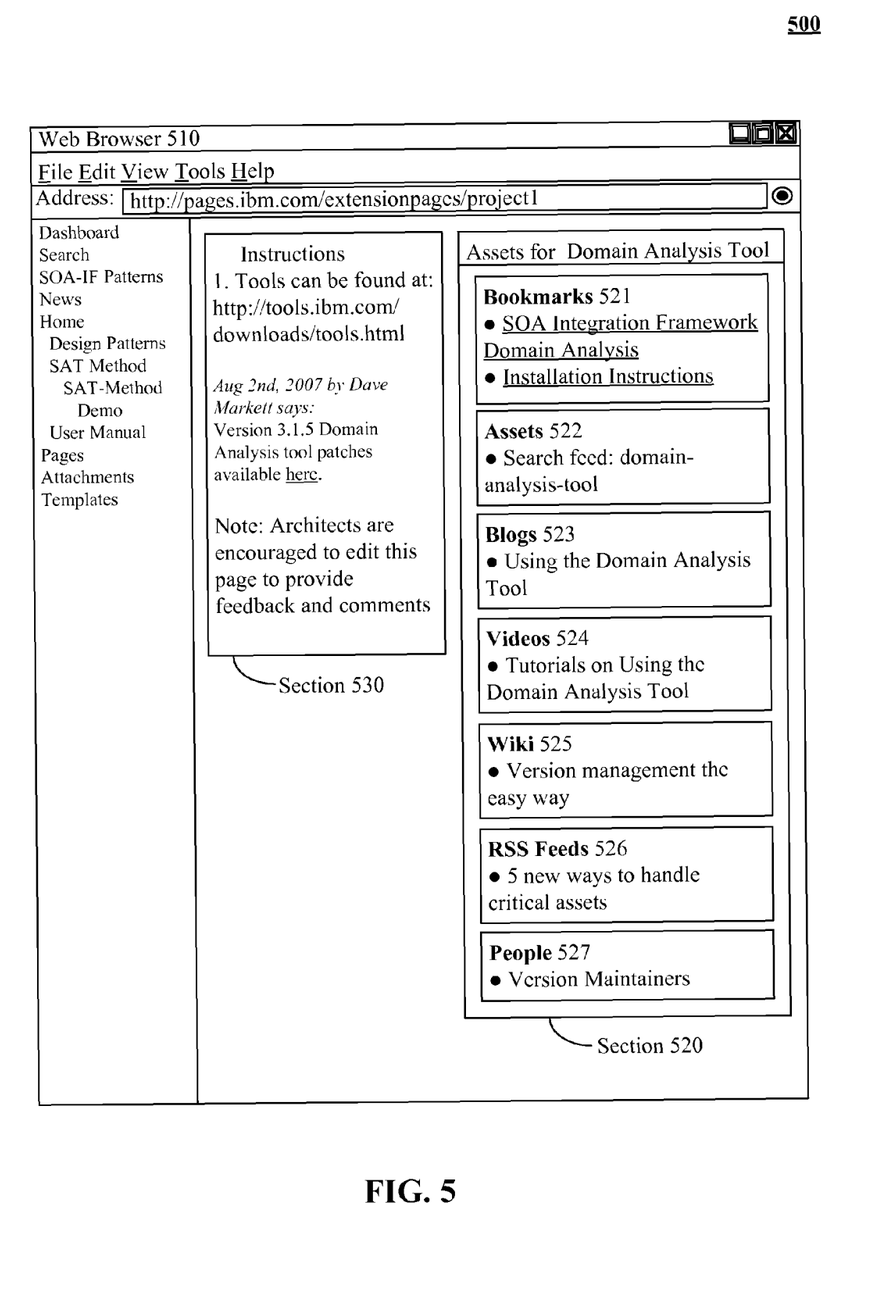
FIG. 5 is a schematic diagram illustrating a graphical user interface (GUI) for extending unified process content to include dynamic and collaborative content in accordance with the embodiment of inventive arrangements disclosed herein.

FIG. 5 is a schematic diagram illustrating a graphical user interface (GUI) 500 for extending unified process content to include dynamic and collaborative content in accordance with the embodiment of inventive arrangements disclosed herein. GUI 500 can be performed in the context of system 300. In GUI 500, a consumer can interact with a Web browser 510 presenting an extension page comprising of dynamic and collaborative content in a unified process. Section 520 can include dynamic content 521-527 wherein content can be created by consumers for other consumers of the unified process. Section 530 can include a collaborative area wherein consumers can create, edit and delete content such as comments, hypertext links, and the like.

Section 520 can include content 521-527 which can include content that is dynamically generated on page request. In one embodiment, consumers can create personalized page views with content that can only be accessible the author of the content. Consumers can choose to publish their changes which can allow their change to be present to other consumers viewing the extension page. For example, a consumer using an asset 522 frequently can add a customized search result to their extension page to allow rapid access of the resource. Assets 522 can present documentation, online course material, associated reading material, patterns, tooling for services identification and the like.

In one embodiment, multimedia content such as videos 524 can be embedded in section 520 of the extension page. Other multimedia content such as FLASH based technical presentations, podcasts, interactive demos and the like can be present. Pertinent Wiki 525 entries can be presented to a consumer viewing the extension page. When no appropriate entries appear, the consumer can be presented with an option to add a Wiki entry for the specific context. People 527 entity can be used to provide current contact details for practitioners associated with the process. Further, people 527 can indicate a consumer's online status and provide a mechanism such as live chat to communicate with online consumers. Offline consumers can be messaged via email, private message system, and the like.

Section 530 can include comments regarding versioning specific content, tooling, and assets important to consumers. Further, access to resources such as software updates, changes, requirements, guidelines and the like can be delineated in section 530.

Figure 6:
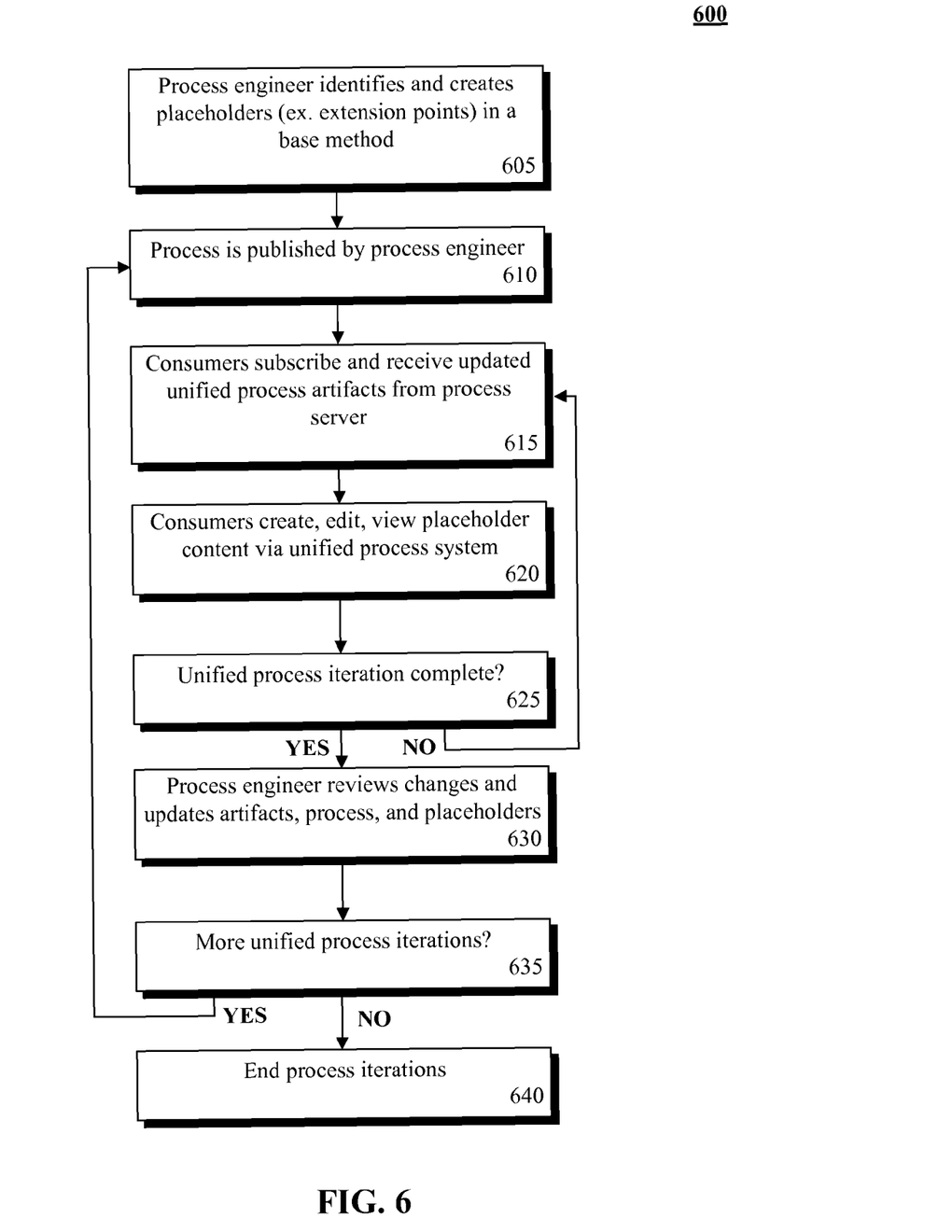
FIG. 6 is a flowchart illustrating a method for extending unified process content to include dynamic and collaborative content in accordance with the embodiment of inventive arrangements disclosed herein.

FIG. 6 is a flowchart illustrating a method 600 for extending unified process content to include dynamic and collaborative content in accordance with the embodiment of inventive arrangements disclosed herein. Method 600 can be performed in the context of system 300. In method 600 a process engineer can create placeholder entities in a unified process for future addition of dynamic and collaborative content by consumers of a unified process.

In step 605, a process engineer can identify and create placeholders (ex. extension points) in a base unified process method. In step 610, the process can be published by the process engineer. In step 615, consumers can subscribe and receive updated unified process artifacts from process server. Consumers can create, edit, view placeholder content via unified process system, as shown in step 620. In step 625, if the unified process iteration is complete, the method can proceed to step 630, else the method can return to step 615. In step 630, the process engineer can review changes and update artifacts, process, and placeholders. In step 635, if there are more unified process iterations the method can return to step 610, else the method can proceed to step 640. In step 640, the unified process iterations can end and a new version of the unified process can begin.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A unified process system comprising:
a unified process system comprising hardware and software configured to store, manage, organize, and present information and artifacts associated with a unified process, wherein said unified process is an extensible, iterative, and incremental software development process framework, wherein said unified process system comprises a placeholder defining tool configured to permit an authorized process engineer to associate placeholders with base methods of the unified process, wherein the placeholders act as an access point to content that extends the base methods, wherein unified process consumers are able to input content to the placeholders after the unified process is published, where the input content is thereafter automatically stored by the unified process system and is accessible to other unified process consumers having access to the unified process system; and wherein at least a portion of the placeholders comprise a collaborative content area and a dynamic content area, wherein said collaborative content area is configured to provide guidance on the associated base method, wherein the collaborative content is editable by the unified process consumers and by the process engineers, wherein said dynamic content area is automatically and dynamically built in response to received requests, and wherein said dynamic content area comprises items to assist unified process consumers to conduct at least one task for the associated base method.

2. The system of claim 1, wherein said items of the dynamic content area comprise blog content, WIKI content, current status information for at least one individual related to the base method, and syndicated feed content.

3. The system of claim 1, wherein said items of the dynamic content area comprise video media, experts, presentations, publications, education bookmarks, and documents.

4. A computer program product stored on a non-transitory storage medium for controlling computing equipment, said computer program product being operable to generate a unified process interface, said unified process interface comprising:
a static method interface configured to permit unified process consumers of a unified process to access a plurality of static methods maintained by a unified process server within a data store accessible by the unified process server;
an extension interface programmatically linked to one of the static methods presented within the static method interface, wherein said extension interface permits unified process consumers to modify content presented in the extension interface after the unified process is published, wherein modified content is managed by the unified process server, and wherein other unified process consumers using the extension interface are able to view the modified content;
wherein unified process engineers establish extension points for the static methods and wherein said extension interface is linked to the established extension points;
and wherein the extension interface further comprises a collaborative content area configured to provide guidance on an associated base method, wherein the collaborative content is editable by the unified process consumers and by process engineers, wherein the extension interface further comprises a dynamic content area, which is automatically and dynamically built in response to received requests, wherein said dynamic content area comprises items to assist unified process consumers to conduct at least one task for the associated base method.

5. The computer program product of claim 4, wherein the static method interface and the extension interface are client-side interfaces rendered within a browser from Web pages served by the unified process server.

6. The computer program product of claim 4, wherein said static method interface and said extension interface provide content associated with an inception, an elaboration, a construction, and a transition phase of the unified process.

7. The computer program product of claim 4, wherein said static method interface and said extension interface provide content associated with a requirement, a design, an implementation, a testing, and a project management stage of the unified process.

8. The computer program product of claim 4, wherein said unified process consumers are unable to edit static method content, wherein unified process engineers are able to edit static method content.

9. A server of unified process artifacts comprising:
- a set of programmatic instructions stored in a machine readable medium configured to cause a server-side machine to store, manage, organize, and present information and artifacts associated with a unified process, wherein the information and artifacts is able to be presented to a plurality of unified process consumers accessing the content from a plurality of clients via a browser; and
- a data store configured to store the information and artifacts, wherein said artifacts comprise a plurality of unified process methods, wherein said data store comprises a plurality of placeholders, wherein each placeholder is associated with one of the unified process methods, wherein the placeholders act as an access point to content that extends unified process methods, wherein at least one process engineer is authorized to enter new unified process methods and to edit base content of the unified process methods and to associate new placeholders with the unified process methods, wherein said unified process consumers lack permissions to add new unified process methods, lack permission to edit base content of the unified process methods, and lack permission to associate new placeholders with the unified process methods, and wherein unified process consumers are able to input content to the placeholders after the unified process is published, where the input content is thereafter automatically stored by a unified process system and is accessible to other unified process consumers having access to the unified process system;
- and wherein at least a portion of the placeholders comprise a collaborative content area and a dynamic content area, wherein said collaborative content area is configured to provide guidance on an associated base method, wherein the collaborative content is editable by a set of users having suitable permissions, said set comprising the unified process consumers and the process engineers, wherein said dynamic content area is automatically and dynamically built in response to received requests, and wherein said dynamic content area comprises items to assist unified process consumers to conduct at least one task for the associated base method.

10. The system of claim 9, wherein said items of the dynamic content area comprise at least three of blog content, WIKI content, current status information for at least one individual related to the base method, syndicated feed content, video media, experts presentations, publications, education, bookmarks, and documents.

11. The system of claim 9, further comprising:
- a placeholder Web interface programmatically linked to one of unified process methods presented within a method Web interface, wherein said placeholder Web interface permits unified process consumers to modify content presented in the placeholder Web interface, wherein modified content is managed by the unified process server, and wherein other unified process consumers using the placeholder Web interface are able to view the modified content.

* * * * *